Dec. 5, 1950 A. ANASTASI 2,532,590
SAFETY SEAT FOR WASHING WINDOWS
Filed Oct. 6, 1947 2 Sheets-Sheet 1

Inventor
Anthony Anastasi

By Clarence A. O'Brien
and Harvey B. Jacobson
Attorneys

Dec. 5, 1950 A. ANASTASI 2,532,590
SAFETY SEAT FOR WASHING WINDOWS
Filed Oct. 6, 1947 2 Sheets-Sheet 2
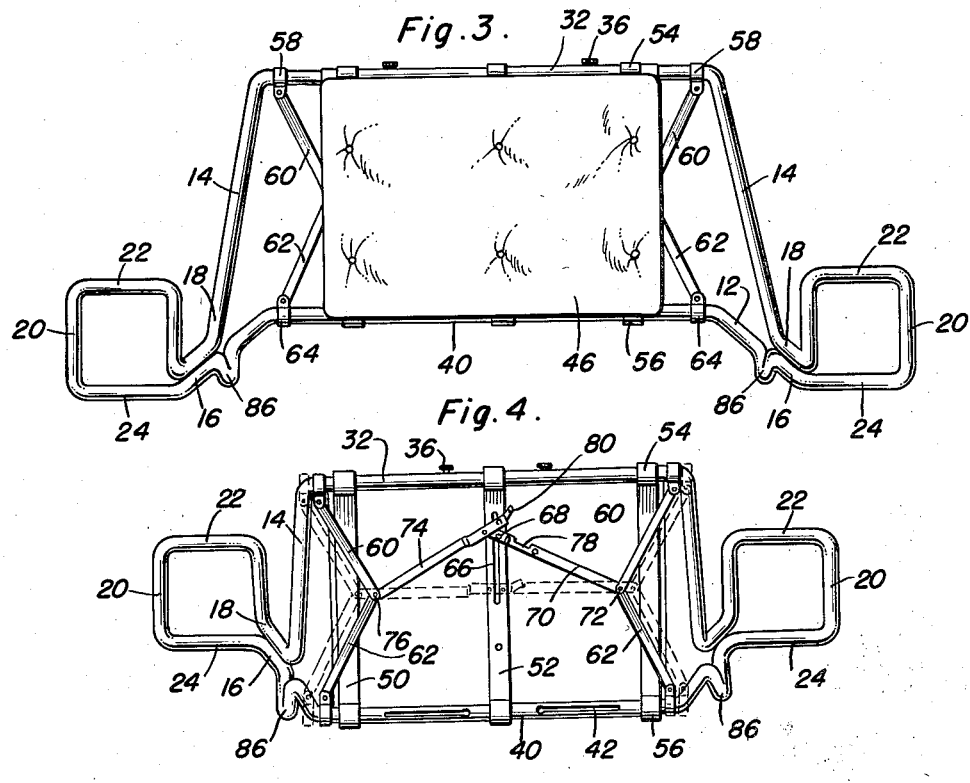
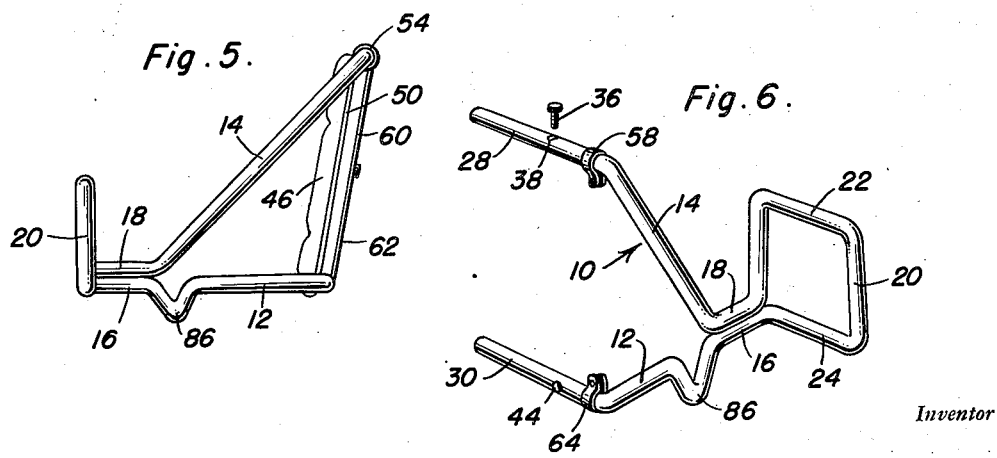
Inventor
Anthony Anastasi
By *Clarence A. O'Brien and Harvey B. Jacobson*
Attorneys Patented Dec. 5, 1950

2,532,590

UNITED STATES PATENT OFFICE 2,532,590

SAFETY SEAT FOR WASHING WINDOWS

Anthony Anastasi, Dorchester, Mass.

Application October 6, 1947, Serial No. 778,178

7 Claims. (Cl. 20—71)

1

This invention relates to new and useful improvements in window attachments, and the primary object of the present invention is to provide a safety seat that is quickly and readily applied to a window frame so that the windows thereof may be conveniently and safely cleaned or repaired.

Another important object of the present invention is to provide a safety seat for windows including novel and improved means whereby the same may be selectively adjusted so that the same may be applicable for window frames of various sizes.

A further object of the present invention is the provision of a safety seat for window frames including novel and improved facing strip engaging means that will retain the seat in position to a window frame without marring or defacing the facing strips of the window frame.

A still further aim of the present invention is to provide a safety seat of the aforementioned character which is quickly and readily disassembled or assembled, that is strong and reliable in use, simple and practical in construction, neat and attractive in appearance, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 3 is a front elevational view of the present safety seat attachment for windows;

Figure 4 is a rear elevational view of Figure 3;

Figure 5 is an end view of Figure 3;

Figure 6 is a perspective view of one of the side members used in conjunction with the present invention;

Figure 1:
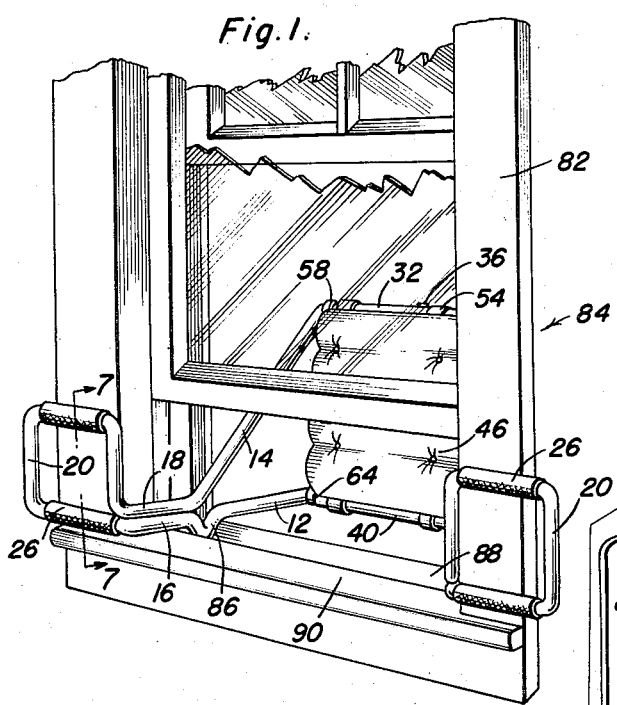
Figure 1 is a fragmentary perspective view of a window construction looking from the inside and showing the present invention applied thereto.
Figure 7:
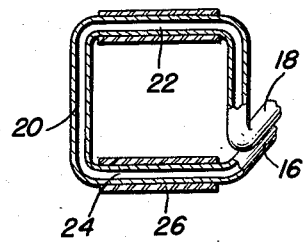
Figure 7 is a longitudinal vertical sectional view of one of the face strip engaging members taken substantially on the plane of section line 7—7 of Figure 1.
Figure 8:
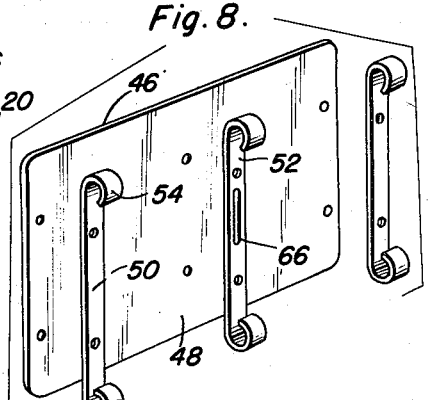
Figure 8 is a group perspective view of the back rest and support means therefor.
Figure 2:
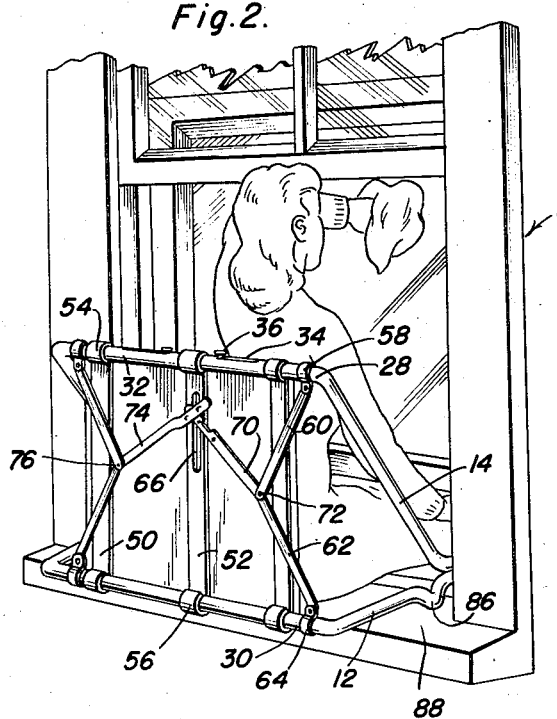
Figure 2 is a similar view of Figure 1 looking from the outside and showing the window seat in use.
Figure 9:
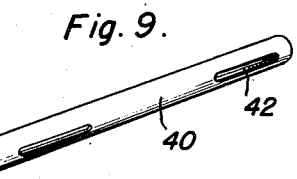
Figure 9 is a perspective view of one of the tubular members that slidably connects the side members.

Referring now to the drawings in detail wherein, for the purpose of illustration, there is disclosed a preferred embodiment of the present invention, the numeral 10 represents a pair of side members generally, each of which is formed from a single length of tubular pipe and includes a horizontal base portion 12 and an inclined side portion 14, which meet at their forward ends 16 and 18. Integrally formed with the meeting forward ends 16 and 18 of the base portion 12 and side portion 14 is an angular, preferably square bearing portion 20, on the upper horizontal side 22 and lower horizontal side 24 of which is suitably secured wearing sleeves 26.

The free ends of the base portion 12 are turned inwardly to form angular lower horizontal extensions 28 and the free ends of the inclined side sections 14 are also turned inwardly to provide angular upper horizontal sections 30 that are spaced parallel to the upper extensions 28.

An upper tubular member 32 open at each end slidably engages the upper extensions 28 of the side members 10 and is provided with spaced longitudinal slots 34 adjacent each end that slidably engage fasteners 36 adjustably received in threaded apertures 38 provided in the upper peripheries of the extensions 28.

Slidably engaging the lower extensions 30 is a lower tubular member 40 also having spaced longitudinal slots 42 adjacent each end that slidably engage similar fasteners 36 carried by threaded apertures 44 provided in the outer side peripheries of the lower extensions 30.

The numeral 46 represents a preferably rectangular cushioned back rest having a base portion 48 to which there is removably secured a pair of spaced parallel vertical end brace straps 50 and interposed between said straps 50 is an intermediate vertical brace strap 52. The ends of these brace straps 50 and 52 are turned outwardly from the base portion 48 to provide sleeves 54 and 56 that embrace the upper tubular member 32 and the lower tubular member 40.

Mounted on each of the upper extensions 28, adjacent their juncture with the side portion 14 is a split clamp 58 that is pivotally connected to one end of an upper link 60. The lower free ends of these links 60 are pivotally connected to the upper free ends of lower links 62 that are pivoted on split clamps 64 slidably carried by the lower extensions 30.

Slidably mounted in a vertical slot 66 provided in the intermediate strap 52 is a guide pin 68 that is pivotally secured adjacent the inner end of a side arm 70, the outer end of the side arm being pivoted, as at 72, to the joined ends of one pair of the upper links 60 and lower links 62. Pivoted to the inner end of the side arm 70 is a further side arm 74, the outer end of which is pivoted as at 76 to the other pair of upper links 60 and lower links 62. A notch 78 provided in arm 70 engages a suitable locking latch 80 carried by the other side arm 74 for locking the arms 70 and 74 in an aligned position at the lower end of the slot 66.

In practical use of the device, the bearing portions 20 engage the facing strips 82 of a window frame 84, with the side members extending outwardly from the window frame. V-shaped protuberances or detents 86 are provided in the base portion 12 and bear upon the sub-sill 88 of the window and against the main sill 90, to prevent movement of the side members inwardly.

Obviously, by adjusting the extensions 28 and 30 in the tubular members 32 and 40, the length of the seat may be adjusted for various widths of windows in a safe manner, with the links 70 and 74 permitting simultaneous equal spreading of the extensions 28 and 30 in the tubular members.

In view of the foregoing description taken in conjunction with the accompanying drawings, it is believed that a clear understanding of the device will be quite apparent to those skilled in this art. A more detailed description is accordingly deemed unnecessary.

It is to be understood, however, that even though there is herein shown and described a preferred embodiment of the invention, the same is susceptible to certain changes fully comprehended by the spirit of the invention as herein described and within the scope of the appended claims.

Having described the invention, what is claimed as new is:

1. A window seat comprising a pair of side members, angular cross bars carried by each of said side members, connecting bars slidably engaging said cross bars of said side members, means for selectively adjusting said cross bars relative to said connecting bars, a back rest carried by said connecting bars, and means carried by said side members for engaging the facing strips of a window frame.

2. A window seat comprising a pair of side members, an upper angular bar and a lower angular bar carried by each of said side members at one end, tubular members slidably engaging said upper bars and lower bars, means for adjusting said upper bars and lower bars relative to said tubular members, brace means connecting said tubular members, a back rest carried by said brace means, and angular extensions at the opposite ends of said side members for engaging the facing strips of a window frame.

3. A window seat comprising a pair of side members, an upper angular bar and a lower angular bar carried by each of said side members at one end, tubular members slidably engaging said upper bars and lower bars, means for adjusting said upper bars and lower bars relative to said tubular members, brace means connecting said tubular members, a back rest carried by said brace means, further brace means connecting said upper bars and lower bars, and angular extensions at the opposite ends of said side members for engaging the facing strips of a window frame.

4. The combination of claim 3 wherein said further bracing means includes split brackets carried by each of said upper bars and said lower bars, links pivotally secured at one end to each of said brackets, a locking mechanism slidably mounted on said brace means including a pair of side arms, and means pivotally connecting said side arms to the links of each of said upper and lower bars.

5. A window seat comprising a pair of side members each formed of a single length of tubing and including a horizontal base portion and an inclined side portion connected at their forward ends, an angular bearing portion integrally formed at the forward end of said base portions for engaging the facing strips of a window frame, upper substantially right angular extensions carried by the free ends of said inclined side portions, lower substantially right angular extensions carried by the free ends of said base portions, upper tubular members slidably connecting said upper extensions, lower tubular members connecting said lower extensions, means for selectively adjusting said extensions relative to said tubular members, brace means connecting said tubular members, a back rest carried by said brace means, and further brace means connecting said extensions to each other.

6. The combination of claim 5 wherein said further brace means includes pivotal links, and means pivotally and lockably securing said links to said first-mentioned brace means.

7. The combination of claim 5 wherein said base portions include detents that bear upon a sub-window sill adjacent a window sill to prevent movement of said side members in one direction.

ANTHONY ANASTASI.

REFERENCES CITED

The following references are of record in the file of this patent:

UNITED STATES PATENTS

| Number | Name | Date |
| --- | --- | --- |
| 2,277,608 | Rosenblatt | Mar. 24, 1942 |